(No Model.)  3 Sheets—Sheet 1.
F. H. RICHARDS.
BUTTON FASTENER FEEDING MACHINE.
No. 326,153.   Patented Sept. 15, 1885.
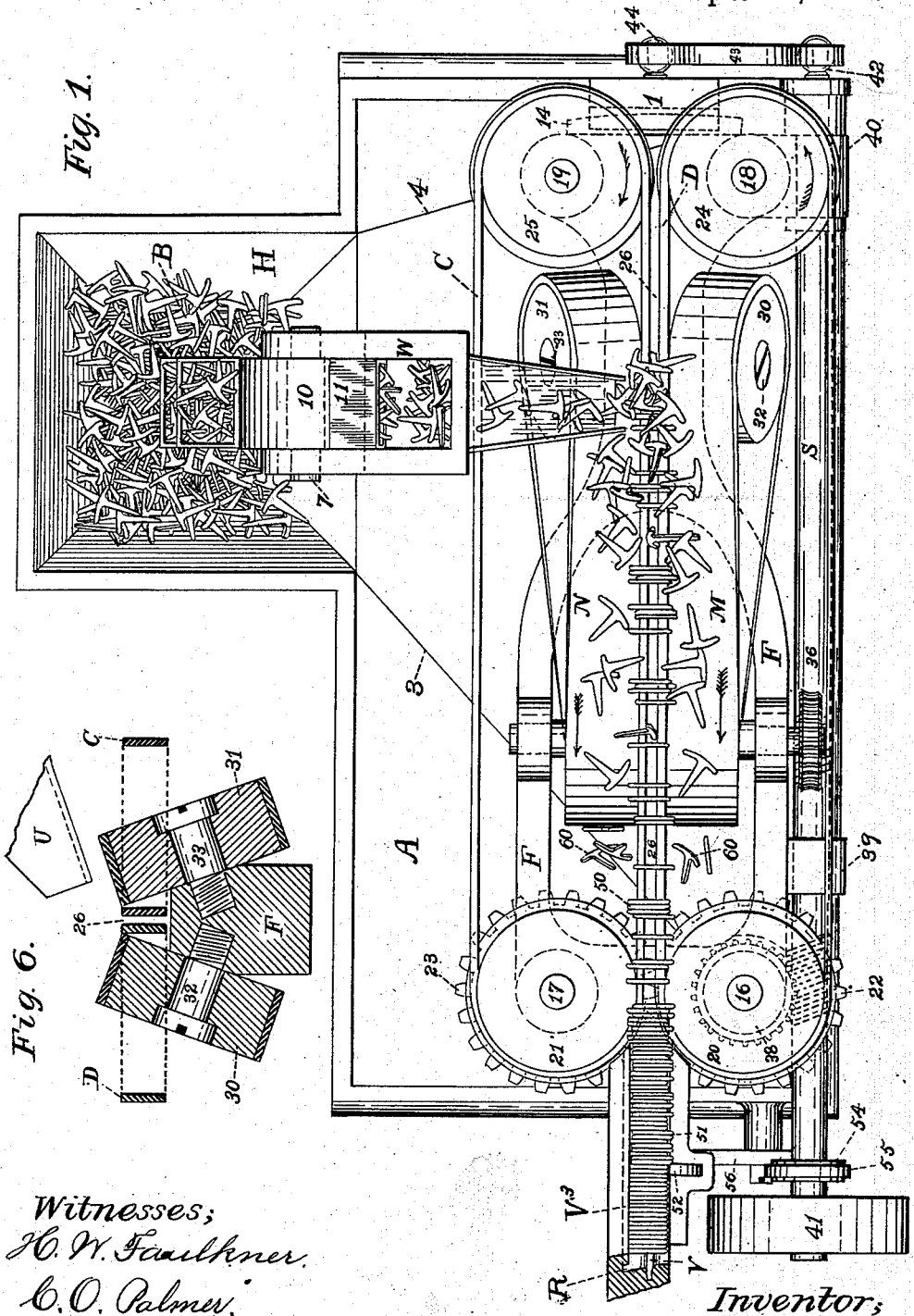
Witnesses:
H. W. Faulkner.
C. O. Palmer.
Inventor:
Francis H. Richards.

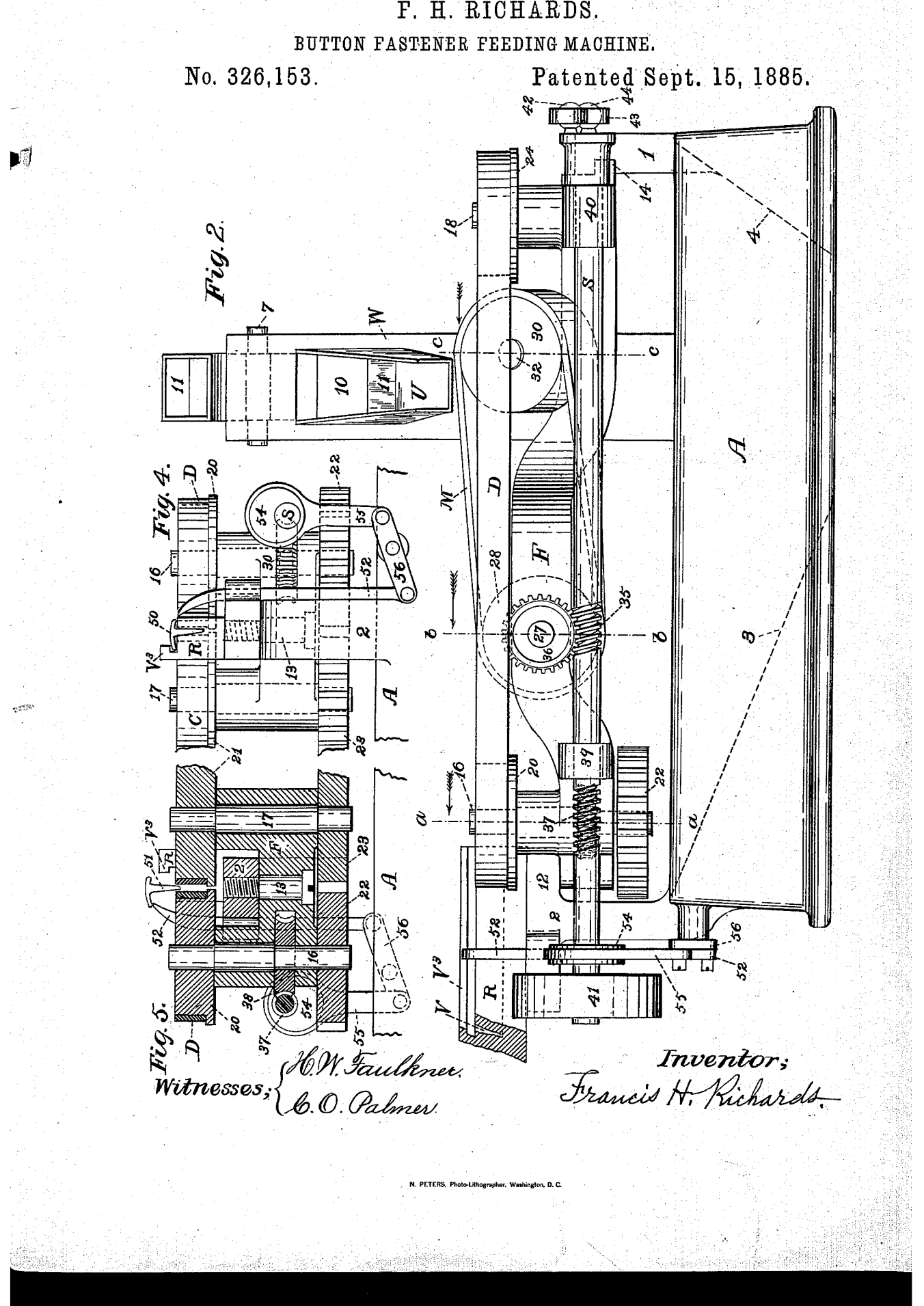

(No Model.) 3 Sheets—Sheet 2.

F. H. RICHARDS.
BUTTON FASTENER FEEDING MACHINE.

No. 326,153. Patented Sept. 15, 1885.

Witnesses:
H. W. Faulkner
C. O. Palmer

Inventor:
Francis H. Richards

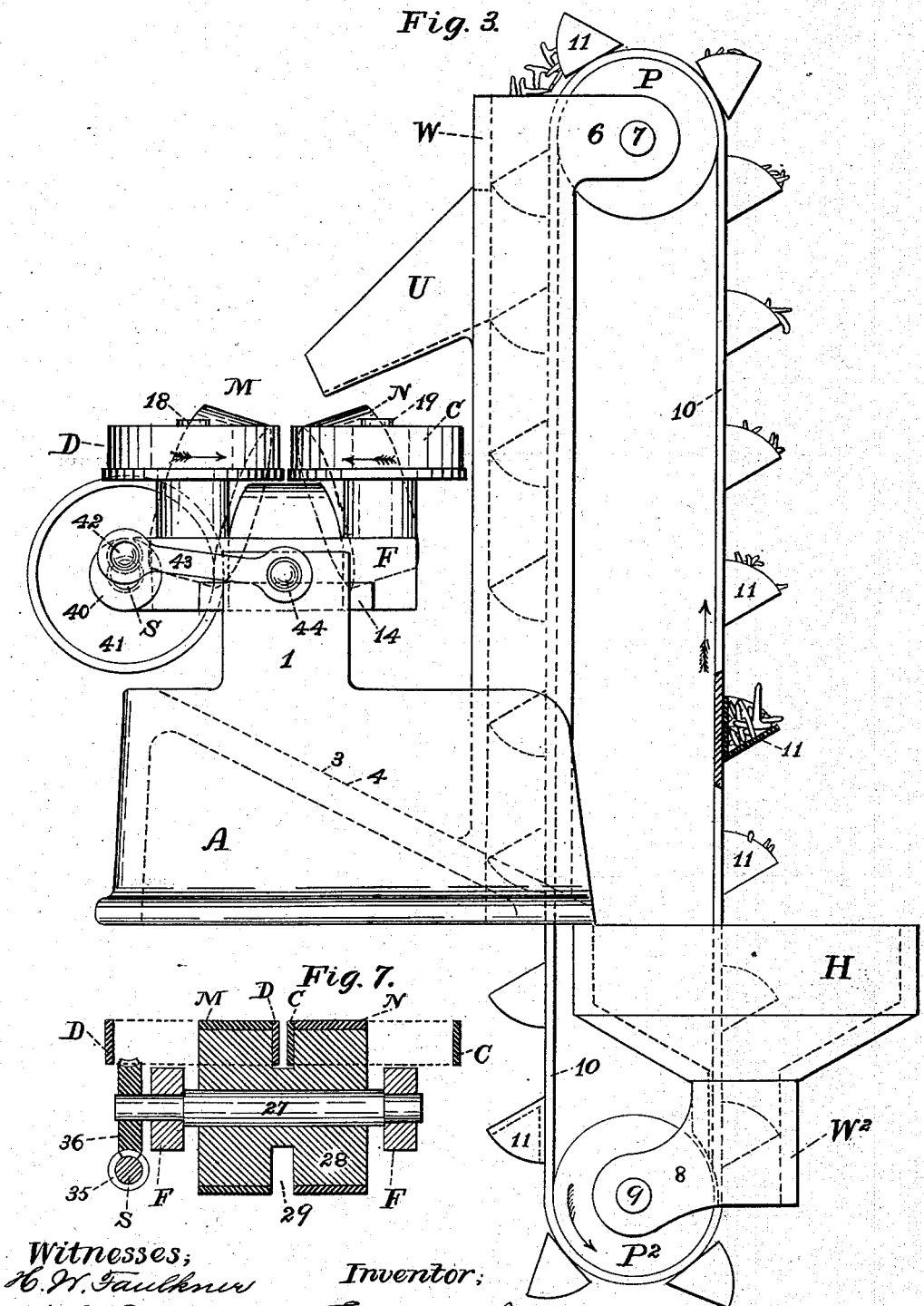

UNITED STATES PATENT OFFICE.

FRANCIS H. RICHARDS, OF SPRINGFIELD, MASS., ASSIGNOR TO THE AMERICAN BUTTON FASTENER COMPANY, OF NEW BRITAIN, CONN.

BUTTON-FASTENER-FEEDING MACHINE.

SPECIFICATION forming part of Letters Patent No. 326,153, dated September 15, 1885.

Application filed December 26, 1884. (No model.)

*To all whom it may concern:*

Be it known that I, FRANCIS H. RICHARDS, a citizen of the United States, residing at Springfield, county of Hampden, State of Massachusetts, have invented certain new and useful Improvements in Button-Fastener-Feeding Machines, of which the following is a specification, reference being had to the accompanying drawings, in which—

Figure 1 is a plan view of a machine embodying my present improvements. Fig. 2 is an elevation of the front side of the same machine. Fig. 3 is an elevation of the right-hand end in Figs. 1 and 2. Fig. 4 is a partial elevation of the end at the left hand in Figs. 1 and 2. Fig. 5 is a partial section in line *a a*, Fig. 2. Fig. 6 is a similar section in line *c c*, Fig. 2. Fig. 7 is another similar section in line *b b*, Fig. 2.

Similar reference-characters refer to similar parts throughout the several views.

This invention relates to improvements in machinery for feeding that kind of button-fasteners known in market as "Kempshall's One-Prong Button-Fasteners" from a hopper into a fastener-receiving channel or magazine.

The object of the invention is to provide a machine adapted to automatically feed said button-fasteners, or others substantially like them, into the said channel so that they will all rest therein in the same position.

To this end my invention consists in certain devices and combinations of mechanism, which will first be described in connection with the drawings and afterward particularly pointed out in the claims.

In the drawings, A designates the base of the machine, and 1 2 are posts formed on said base, which support the vibrating frame F, which frame carries the principal or feeding mechanism of the machine. At the rear of the base a hopper, H, is provided into which to throw the fasteners to be fed. This hopper may be situated immediately below the base, as shown, or it may be placed lower or may even form a part of said base, at the discretion of the maker. For the purpose of returning to the hopper all those fasteners which fall from the feeding mechanism onto the base, the top of said base is made inclined from front to rear and from each end toward the hopper, thus constituting a sort of spout opening into said hopper, as indicated by lines 3 and 4.

Immediately in front of the hopper there rises from the base a tubular column or well, W, having at its upper end bearings 6 for shaft 7, which carries pulley P. Dependent from the hopper is another well, $W^2$, which is similar in form and size to well W, and has bearings 8 for shaft 9, which carries pulley $P^2$. This pulley is to be driven in the direction of the arrow thereon by any convenient means. (Not shown.)

An endless conveyer-belt, 10, is carried by pulleys P and $P^2$, as shown best in Fig. 3, and is furnished with a series of buckets, 11, which are fitted to slide closely yet freely through said wells. As they pass up through the mass of button-fasteners B, Fig. 1, in the hopper each bucket carries up a charge of the fasteners, and, carrying them up over pulley P and into well W, dumps them onto the back of the bucket next below, from which they slide off into spout U, whereby they are delivered to the feeding mechanism. It will be understood that the buckets are arranged on the conveyer-belt in such a manner that before one emerges from the top of the well $W^2$ another has entered at the lower end of said well, so that the fasteners cannot at any time pass down through it.

The frame F is pivotally supported at one end against the under side of lug 12, which lug projects from the top of post 2 by a pivot-screw, 13, Figs. 4 and 5. At the other end it is supported by a lug, 14, which fits a slot formed in post 1, and is adapted to have a lateral motion, as and for the purpose hereinafter described. On either side of pivot 13 the frame F carries a vertical shaft, 16 and 17, which are respectively provided at their upper ends with carrier-belt-driving wheels 20 and 21, and at their lower ends with gears 22 and 23, for driving shaft 17 from shaft 16. The laterally-movable end of frame F is provided with two studs, 18 and 19, carrying wheels 24 and 25, which are similar to wheels 20 and 21. These four wheels carry two endless carrier-belts, C and D, which are tightly drawn over said wheels and form the walls of a channel, 26, for receiving the prongs of the fasteners.

At some distance to the right hand of wheels 20 and 21 is the horizontal shaft 27, supported in bearings formed in the frame and carrying drum 28, which has a groove, 29, to permit the passage of belts C and D, and carries on either side of said groove one end of the fastener-supporting endless aprons M and N. These aprons on the upper side lie close to the walls of channel 26, and are supported at the right-hand end by wheels 30 and 31, said wheels being carried, respectively, on studs 32 and 33, which are preferably set obliquely in the frame, as shown in Fig. 6, for the purpose of forming a trough to keep the fasteners at that point close to said channel, as illustrated in Fig. 1. The endless aprons are driven from driving-shaft S by means of any suitable gearing, as worm 35 on said shaft, and worm-wheel 36 on shaft 27. The carrier-belts are driven in a similar way by worm 37 on shaft S and worm-wheel 38 on shaft 16. Said driving-shaft runs on bearings 39 40, formed on frame F. It is driven by means of pulley 41, and is provided with a crank-pin, 42, which is connected by rod 43 to a pin, 44, fixed in post 1. By this means the rotation of shaft S imparts a reciprocating motion to this end of frame F. This motion may also be readily produced by cams, if desired, or by the ordinary cam and spring. The same effect can also be produced by mechanism independent of the driving-shaft.

A fastener-receiving channel, R, is supported on post 2 at the left-hand end of the machine, so that the groove V is a continuation of channel 26. The end of said channel is closely fitted between belts C D, as shown best in Fig. 1, so the fasteners will pass readily from said channel 26. For channel R, I prefer to use the magazine M described and claimed in my application No. 142,969, filed September 13, 1884, to which reference may be had, which magazine is substantially the same as the said channel R shown in the drawings accompanying my present specification. When fasteners come into this channel with the long end of their heads pointing to the rear of the machine, as at 50, Fig. 1, then said long ends project under rib $V^3$ and pass on through the magazine unmolested; but if any fasteners come into said channel with the long end of their heads reversed, as at 51, same figure, they are, on reaching finger 52, thrown out, as in Fig. 5, and conducted back onto the base by a small spout, which I have not shown. The said finger 52 has a vertically-reciprocating motion imparted to it from shaft S by means of eccentric 54, connecting-rod 55, and lever 56, or by some equivalent devices, which shall so operate said finger that it will strike on the under side of the heads of those fasteners which are wrongly placed, as at 51, and drive them out of the channel. It should be understood that the connection between rod 55 and lever 56 is so made as to provide for the slight lateral motion of shaft S.

The operation of my improved button-fastener-feeding machine will be readily understood from the drawings and the preceding description, being as follows: The machinery being properly started up, a quantity of fasteners B, substantially such as described, are thrown into the hopper H in a mass, which slides down in said hopper around belt 10 at the top of well $W^2$. The buckets on said belt take up the fasteners and deliver them into spout U, which conducts them onto the endless aprons, as illustrated in Fig. 1. As they fall from the spout some of the fasteners fall through channel 26, others fall with their prongs in and heads crosswise to said channel, while still others lie on the aprons in a promiscuous way. The motion of the aprons and carrier-belts (which should all move uniformly) carries the fasteners toward the left hand, where the aprons become more nearly horizontal, and said fasteners are shaken up and spread out by the lateral motion of frame F and the feeding mechanism thereon. By this means all of the fasteners are disposed of, some falling into the channel 26 in the position shown at 50 or at 51, others being shaken over the outer edges of the aprons or carried over the ends, as at 60, Fig. 1. Those which remain in said channel are carried along by and between belts C and D, between wheels 20 and 21, which wheels are adjusted to press said belts onto the fastener-prongs with sufficient force to push those fasteners which are ahead along through magazine or channel R, and to or past finger 52, where all which are wrongly placed are thrown out, as above described.

Having thus described my invention, I claim—

1. In a button-fastener-feeding machine, the combination of carrier-belts C and D, having between their faces or broad sides a channel for receiving the prongs of button-fasteners, mechanism, substantially as described, for carrying said belts, and a magazine forming a continuation of said channel, substantially as set forth.

2. The combination of two carrier-belts forming the walls of a channel for receiving the prongs of button-fasteners, the traveling fastener-supporting aprons adjoining said channel-walls, and mechanism, substantially as described, for carrying said belts and aprons, substantially as described.

3. The combination of wheels 20 and 21, wheels 24 and 25, carrier-belts C D, drum 28, wheels 30 and 31, set obliquely, as described, aprons M N, and means, substantially as described, for operating said parts, substantially as set forth.

4. The combination of the carrier-belts and the endless aprons, mechanism for supporting and operating said belts and aprons, a magazine for receiving button-fasteners from said carrier-belts, and means, substantially as described, for supplying said fasteners to said aprons, substantially as set forth.

5. In a button-fastener-feeding machine, the combination, with a suitable base, and with a fastener-receiving magazine fixed thereon, of a frame pivoted to said base near the end of said magazine, and adapted to carry a fastener-feeding mechanism, a fastener-feeding mechanism, substantially as described, carried on said frame, and means, substantially as described, for operating said mechanism, and for imparting a laterally-reciprocating movement to the unpivoted end of said frame, all substantially as described, and for the purpose specified.

6. The combination of magazine R, finger 52, and mechanism, substantially as described, for operating said finger, substantially as set forth, and for the purpose specified.

FRANCIS H. RICHARDS.

Witnesses:
H. W. FAULKNER,
C. O. PALMER.